(12) United States Patent
Desailly et al.

(10) Patent No.: US 7,235,902 B2
(45) Date of Patent: Jun. 26, 2007

(54) COOLING SYSTEM FOR LINEAR MOTORS

(75) Inventors: Roger Desailly, Vitry aux Loges (FR); Alain Jeanne, Amilly (FR)

(73) Assignee: Newport Corporation, Irvine, CA (US)

( * ) Notice: Subject to any disclaimer, the term of this patent is extended or adjusted under 35 U.S.C. 154(b) by 1 day.

(21) Appl. No.: 11/186,111

(22) Filed: Jul. 21, 2005

(65) Prior Publication Data
US 2006/0017331 A1    Jan. 26, 2006

Related U.S. Application Data

(60) Provisional application No. 60/589,639, filed on Jul. 21, 2004.

(51) Int. Cl.
H02K 41/02 (2006.01)
H02K 9/19 (2006.01)

(52) U.S. Cl. .......................... 310/12; 310/54
(58) Field of Classification Search ............ 310/12–15, 310/52–58
See application file for complete search history.

(56) References Cited

U.S. PATENT DOCUMENTS

| | | | |
|---|---|---|---|
| 4,072,101 A * | 2/1978 | La Garcia et al. | 310/13 |
| 5,701,041 A * | 12/1997 | Akutsu et al. | 310/12 |
| 5,783,877 A * | 7/1998 | Chitayat | 310/12 |
| 6,005,310 A * | 12/1999 | Mosciatti et al. | 310/12 |
| 6,300,691 B1 * | 10/2001 | Hwang et al. | 310/12 |
| 6,469,406 B1 * | 10/2002 | Hwang et al. | 310/12 |
| 6,528,905 B1 * | 3/2003 | Hwang et al. | 310/12 |
| 6,762,516 B2 * | 7/2004 | Maruyama | 310/12 |
| 6,847,132 B2 * | 1/2005 | Ukaji | 310/12 |
| 2002/0140298 A1 * | 10/2002 | Maruyama | 310/54 |

FOREIGN PATENT DOCUMENTS

| | | | |
|---|---|---|---|
| JP | 05162040 A | * | 6/1993 |
| JP | 08317627 A | * | 11/1996 |
| JP | 2000092815 A | * | 3/2000 |
| JP | 2001069745 A | * | 3/2001 |

* cited by examiner

*Primary Examiner*—Karl Tamai
(74) *Attorney, Agent, or Firm*—Brian F. Swignton

(57) ABSTRACT

The present application is directed to a linear motor and includes a first mounting plate having an interior face disposing one or more magnetic elements thereon, a second mounting plate having an interior face disposing one or more magnetic elements thereon, a cooling element positioned between the interior faces of the first and second mounting plates and defining one or more cooling passages therein, the cooling passages having one or more heat sink wall members therein, at least one end cap configured to be coupled to cooling element and enclose the cooling passages therein, at least one seal positionable between the end cap and the cooling element and configured to couple the end cap to the cooling element in sealed relation, and a forcer device positioned between the magnetic elements on the first and second mounting plates and configured to movably engage the cooling element.

18 Claims, 4 Drawing Sheets

COOLING SYSTEM FOR LINEAR MOTORS

CROSS REFERENCE TO RELATED APPLICATIONS

The present application claims priority to U.S. Provisional Patent Application Ser. No. 60/589,639 filed Jul. 21, 2004, the contents of which is incorporated by reference in its entirety herein.

BACKGROUND

Presently, linear motors are used significantly in automation systems and devices for a variety of applications. For example, these devices are commonly used in the semiconductor wafer inspection processes and wafer lithography systems. While these devices have proven useful in the past, a number of shortcomings associated with these devices have been identified. For example, the generation of resistive heat within the motor forcer coils has proven problematic. Over time, the generation of heat within these systems has been shown to limit motor performance with respect to speed and motor forcer positioning accuracy.

In light of the foregoing, a number of cooling architectures for linear motor systems have been devised. For example, U.S. Pat. Nos. 4,839,545 and 5,783,877, both issued by Chitayat disclose cooling systems for linear motors. Generally, the cooling methods employed in prior art systems are installed in the motor forcer, where the magnetic coils are located. Such cooling is either accomplished using water or other liquids forced through slotted, laminated, or serpentine cooling passages to remove heat. While these systems have proven somewhat successful in the past, a number of shortcomings have been identified. For example, coupling a water source to a movable forcer is complicated and bulky. In addition, the forcer is a movable element, thereby resulting in an increased risk of a leak of fluid.

In response, other manufacturers have devised an alternate cooling method wherein cold air is blown through a nozzle integrated in the magnetic way onto the forcer. While temperature reductions may be obtained using this approach one disadvantage of this system stems from the fact that a temperature gradient is created in the motor environment. The resultant temperature gradient may negatively affect the positioning accuracy of the linear motor.

In light of the foregoing, there is an ongoing need for cooling systems for linear motors.

SUMMARY

Various embodiments of cooling systems for linear motors are disclosed herein. In one embodiment, the present application discloses a linear motor and includes a first mounting plate having an interior face disposing one or more magnetic elements thereon, a second mounting plate having an interior face disposing one or more magnetic elements thereon, a cooling element positioned between the interior faces of the first and second mounting plates and defining one or more cooling passages therein, the cooling passages having one or more heat sink wall members therein, at least one end cap configured to be coupled to the cooling element and enclose the cooling passages therein, at least one seal positionable between the end cap and the cooling element and configured to couple the end cap to the cooling element in sealed relation, and a forcer device positioned between the magnetic elements on the first and second mounting plates and configured to movably engage the cooling element.

In another embodiment, the present application discloses a linear motor and includes a first mounting plate having an interior face disposing one or more magnetic elements thereon, a second mounting plate having an interior face disposing one or more magnetic elements thereon, a cooling element positioned between the interior faces of the first and second mounting plates and defining one or more cooling passages therein, the cooling passages having one or more heat sink wall members therein, at least one end cap configured to be coupled to the cooling element and enclose the cooling passages therein, the end cap having one or more ports formed thereon, the one or more ports in fluid communication with the cooling passages formed within the cooling element, at least one seal positionable between the end cap and the cooling element and configured to couple the end cap to the cooling element in sealed relation, and a forcer device positioned between the magnetic elements on the first and second mounting plates and configured to movably engage the cooling element.

In addition, the present application discloses a method of cooling a linear motor and recites coupling at least one source of at least one cooling fluid to at least cooling passage formed in a cooling element of the linear motor, flowing the cooling fluid into the cooling passages, and evacuating cooling fluid from the cooling passages.

Other features and advantages of the embodiments of the systems and methods disclosed herein will become apparent from a consideration of the following detailed description.

BRIEF DESCRIPTION OF THE DRAWINGS

Various embodiments of cooling systems for linear motors will be explained in more detail by way of the accompanying drawings, wherein:

FIG. 7 shows a perspective view of an embodiment of a forcer device for use within a linear motor.

DETAILED DESCRIPTION

Figure 1:
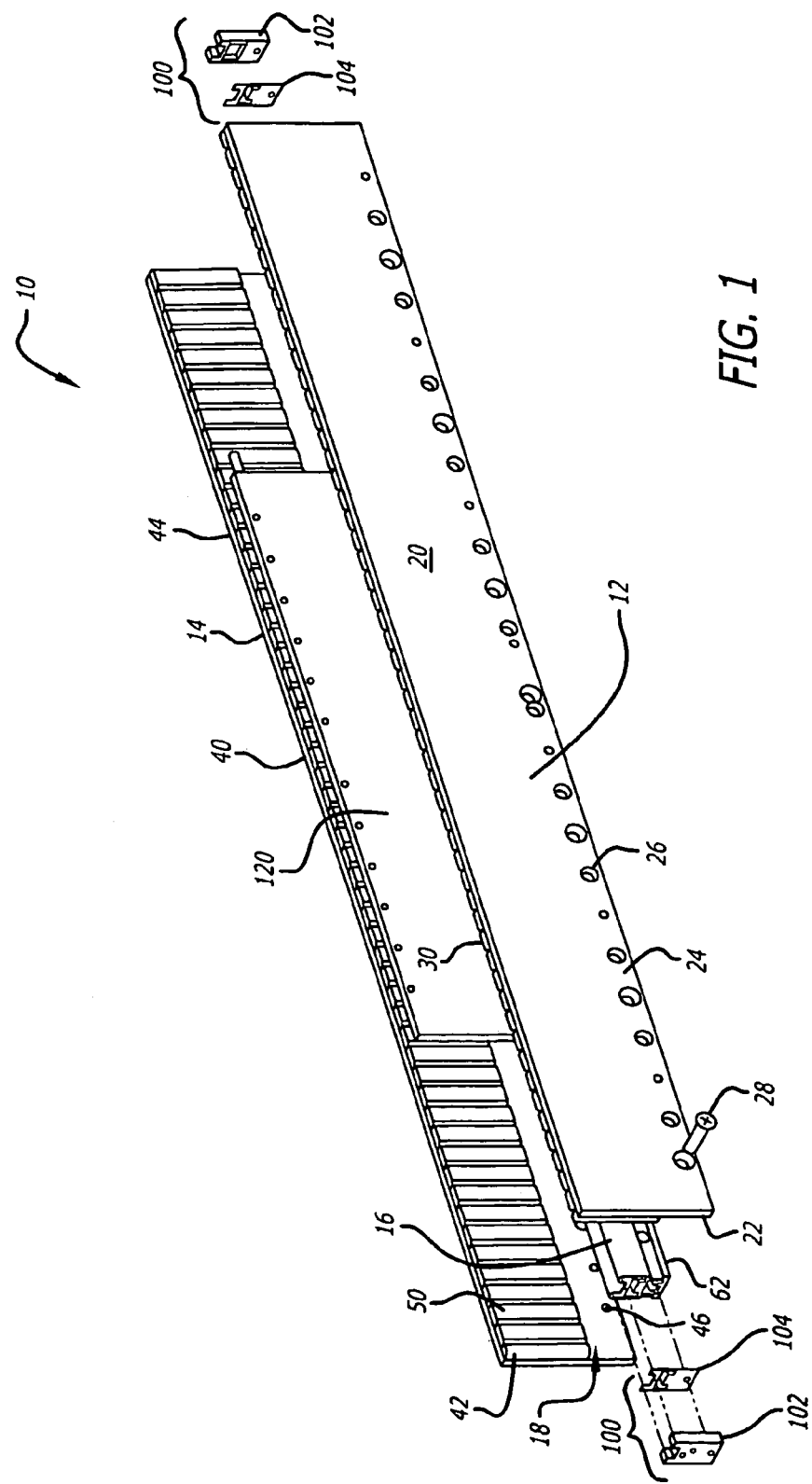
FIG. 1 shows a perspective view of an embodiment of a cooling system for a linear motor.

FIG. 1 shows an embodiment of an improved cooling system for linear motors. As shown, the linear motor 10 includes a first mounting plate 12, a second mounting plate 14, and a cooling element 16 positioned therebetween. As shown, in the illustrated embodiment the first and second mounting plates 12, 14, respectively, and the cooling element 16 form a device channel 18. The device channel 18 may be formed in any variety of lengths and/or widths. In one embodiment, the first and second mounting plates 12, 14 are manufactured from the same material. In an alternate embodiment, the first and second mounting pates 12, 14 are manufactured from different materials. Exemplary materials, include, without limitation, various metals such as steel, aluminum, titanium, brass, ferromagnetic materials, copper, and alloys; various plastics, including vinyl, polyester, polystyrene, and polycarbonate; ceramic materials, elastomers; fiberglass and composite materials; glass impregnated or reinforced materials, and the like. As such, the first and second mounting plates 12, 14 may be manufactured in any variety of lengths, shapes, and/or thicknesses as desired.

Referring again to FIG. 1, the first mounting plate 12 may include a first mounting plate body 20 having an interior face 22 and at least an exterior surface 24. One or more fastener recesses 26 sized to receive at least one fastener 28 therein may be formed on the first mounting plate body 20. The interior face 22 may include at least one magnetic element 30 coupled to or otherwise positioned thereon. In one embodiment, the magnetic element 30 comprises a ferromagnetic element. Optionally, the magnetic element 30 may be manufactured from any device or material configured to generate a magnetic field.

As shown in FIG. 1, the second mounting plate 14 may include a second mounting plate body 40 having an interior face 42 and at least an exterior surface 44. One or more fastener recesses 46 sized to receive at least one fastener 28 therein may be formed on the second mounting plate body 40. The interior face 42 may include at least one magnetic element 50 coupled to or otherwise positioned thereon. In one embodiment, the magnetic element 50 comprises a ferromagnetic element. Optionally, the magnetic element 50 may be manufactured from any device or material configured to generate a magnetic field. The first and second mounting plates 12, 14 may or may not be manufactured from the same material. Further, the magnetic devices 30, 50 may or may not be manufactured from magnetic material. Optionally, the first mounting plate 12, the second mounting plate 14, or both may further include an insulating material 140 (see FIG. 8) applied to any one of the surfaces to electrically isolate, thermally isolate, or electrically and thermally isolate the mounting plates 12, 14 from the surrounding environment.

Figure 2:
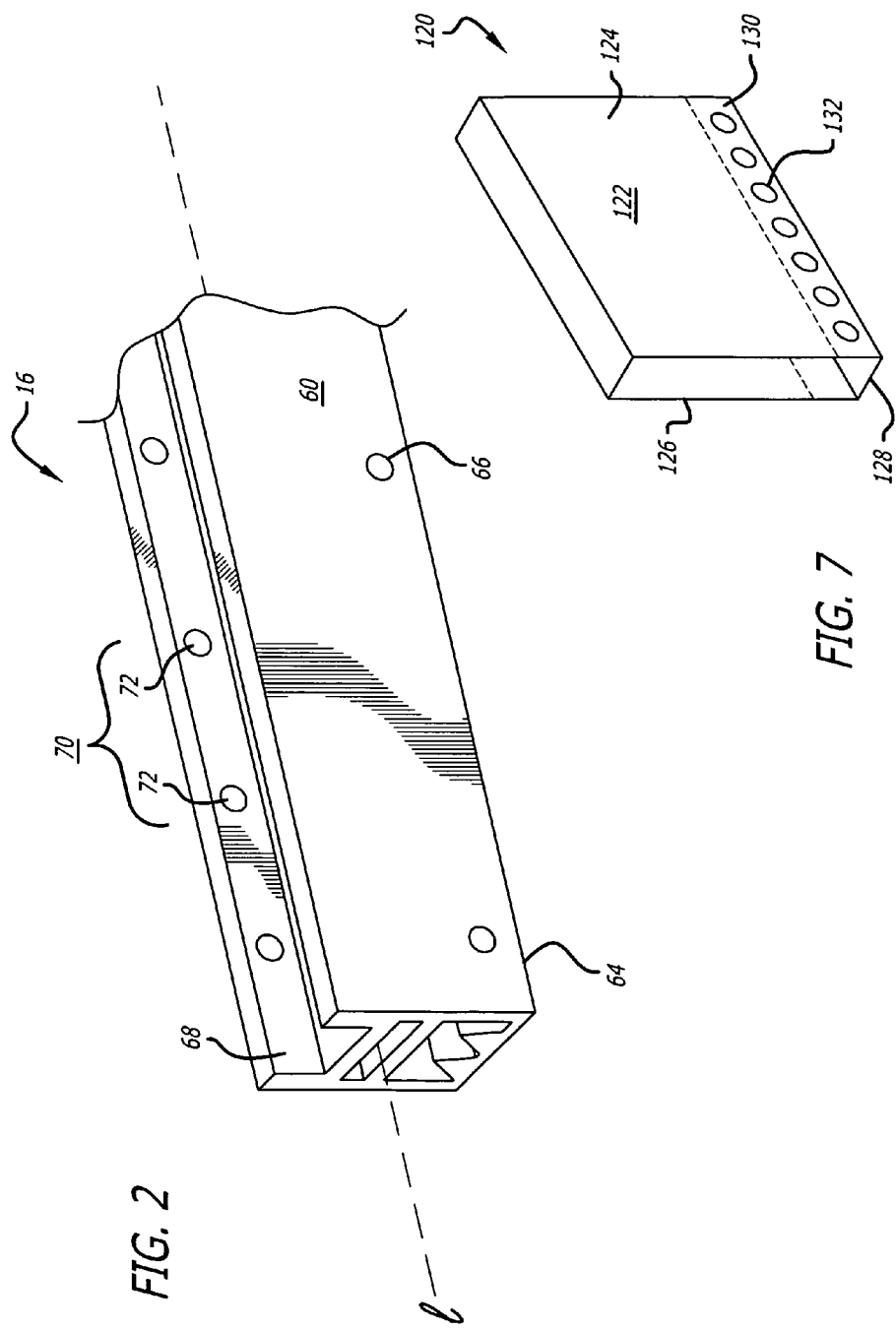
FIG. 2 shows a perspective view of a second end of an embodiment of a cooling element for use in a linear motor.

Referring again to FIG. 1, the cooling element 16 is shown positioned between the first and second mounting plates 12, 14. As shown in FIGS. 1 and 2, the cooling element 16 includes a cooling body 60 having a first end 62 and a second end 64. One or more fastener passages 66 may be formed in the cooling body 60. In one embodiment, the fastener passages 66 are threaded to receive at least one fastener 28 therein and coupled thereto. In an alternate embodiment, the fastener recess 66 comprises a pass-through sized to have at least one fastener 28 traverse therethrough. The cooling body 60 may define at least one exterior canal thereon. In the illustrated embodiment, a singular canal 68 is formed on the cooling body 60. Optionally, multiple canals 68 may be formed on various portions of the cooling body 60. Further, the canal(s) 68 may be co-aligned with the longitudinal axis 1 of the cooling body 60.

Optionally, the cooling body 60 may include one or more bearing systems positioned within the canal 68 or proximate thereto. For example, in the illustrated embodiment a bearing system 70 comprising one or more bearings 72 is positioned within the bearing canal 68. Any variety of bearing systems 70 may be used within the present device including, without limitation, fluid bearings, ball bearings, roller bearings, and the like. Optionally, the cooling body 60 may be manufactured without a bearing system 70 positioned thereon.

Figures 3, 4:
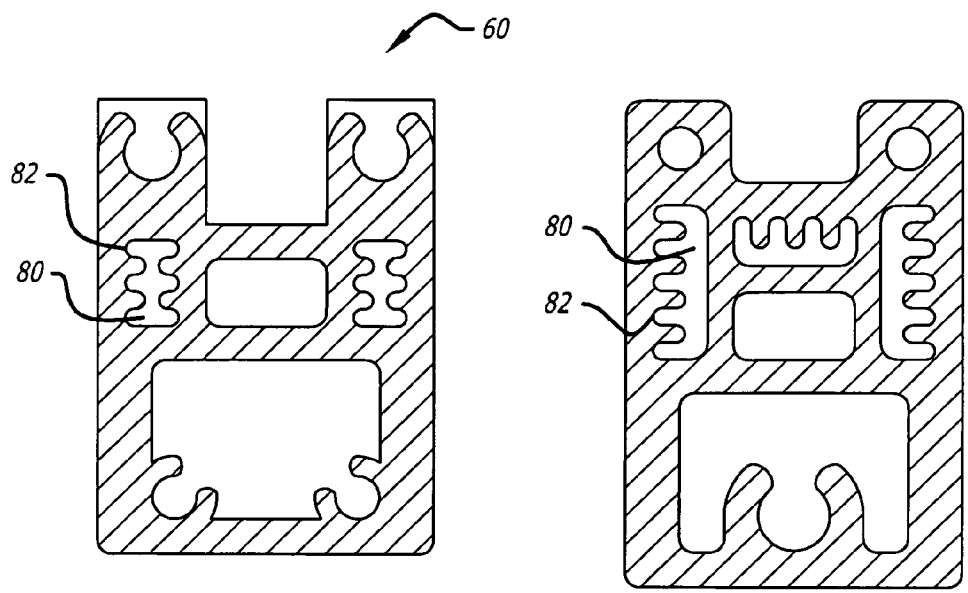
FIG. 3 shows a cross-sectional view of an embodiment of a cooling element for a linear motor.
FIG. 4 shows a cross-sectional view of another embodiment of a cooling element for a linear motor.

As shown in FIGS. 1 and 2, at least one cooling passage 80 may be formed within the cooling body 60 of the cooling element 16. For example, FIGS. 3 and 4 show various exemplary embodiments of cooling passages 80 formed in the cooling body 60. Those skilled in the art will appreciate that any number, size, and/or shape of cooling passages 80 may be formed in the cooling body 60. For example, a cooling element 60 may include formed a variety of heat sink wall members 82 configured to increase the surface area of the cooling passage 80 thereby resulting in an improved thermal transfer efficiency as compared with prior art devices. Those skilled in the art will appreciate that any number, variety, and/or shape of heat sink wall members 82 may be included within the cooling passage 80. For example, in one embodiment the cooling passage 80 includes a plurality of fins or extension acting as heat sink wall members 82. As such, the cooling element 16 may be constructed from any variety of materials, including, including, without limitations, aluminum, steel, titanium, metallic alloys, ceramic, composite materials, and the like.

Figures 5, 6:
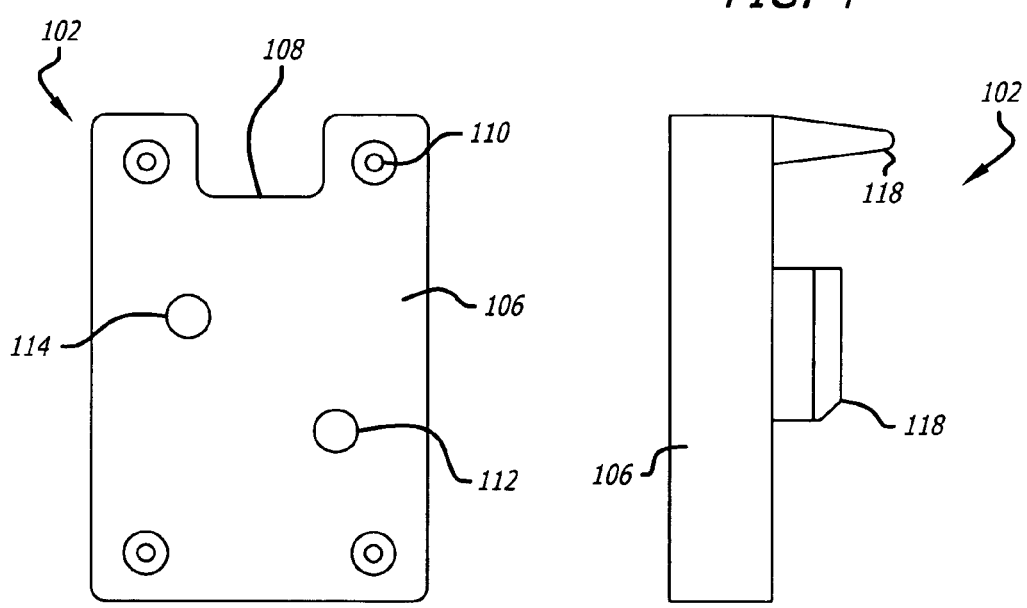
FIG. 5 shows a planar side view of an embodiment of an end cap device attachable to a cooling element for a linear motor.
FIG. 6 shows a planar side view of another embodiment of a end cap for a cooling element of a linear motor.

Referring again to FIG. 1, the linear motor 10 may further include a one or more end cap devices attachable to the cooling element 16. As shown, an end cap device 100 may be coupled to the first end 62 of the cooling body 60, the second end 64 of the cooling body 60, or both ends. The end cap device 100 includes an end cap 102 and at least one seal 104. FIG. 5 shows a detailed view of an embodiment of an end cap 102. As shown, in one embodiment the end cap 102 comprises a end cap body 106 defining at least one canal relief 108 therein. The canal relief 108 may be sized and configured to be positioned proximate to the canal 68 formed on the cooling body 60. (See FIG. 2). Optionally, the end cap body 106 may be manufactured without a canal relief 108 thereby permitting the end cap 102 to act as a stop device.

Referring again to FIG. 5, the end cap body 106 may include one or more fastener ports 110 configured to receive one or more fasteners therein thereby permitting the end cap 102 to be coupled to the cooling element 16. For example, the fastener port 110 may be configured to receive at least one screw, pin, or bolt therein thereby permitting the end cap to be detachably coupled to the cooling element 16. Optionally, the end cap body 106 may be manufactured without fastener ports 110. For example, the end cap 102 may be configured to be non-detachably coupled to the cooling element 16. For example, the end cap 102 may be adhesively coupled to the cooling element 16. In an alternate embodiment, the end cap 102 may be configured to detachably couple to the cooling element 16 using a friction fit, snap fit, or the like. Optionally, the end cap 102 may include one or more extensions configured to engage and be retained by the cooling element 16. For example, FIG. 6 shows an embodiment of an end cap 102 wherein the end cap body 106 includes a number of coupling extensions 118. The coupling extensions 118 may be formed in any variety of shapes and/or sizes as desired. Further, the coupling extensions 118 may be coupled to or integral with the end cap body 106.

Referring again to FIGS. 1 and 5, the end cap 102 may also include one or more ports formed thereon. In the illustrated embodiment the end cap body 106 includes a first port 112 and a second port 114, although any number of ports may be formed on the end cap body 106. These ports 112, 114 may be in communication with one or more cooling passages 80 formed in the cooling element 16. In one embodiment, the first port 112 is in communication with a first passage formed in the cooling element 16 while the second port 114 is in communication with a second passage formed in the cooling element 16. The various ports 112, 114 formed on the end cap 102 may be used as inlets, outlet, or both.

As shown in FIG. 1, at least one seal 104 may be positioned between the end cap 102 and the cooling element 16. In one embodiment, the seal 104 may be used ensure the end cap 102 is coupled to the cooling element 16 in sealed relation. Further, the seal 104 may be formed to ensure the various cooling passages 80 formed in the cooling element 16 are isolated from one another. As such, the seal 104 may be constructed from a variety of materials including, without limitation, silicon, rubber, elastomer, plastic, and the like. As such, any variety of fluids may be flowed through the cooling passage 80 formed in the cooling element 16. Exemplary fluids include, cooling fluids such as Freon, oxygen, water, various oils, liquid nitrogen, and the like. Moreover, different fluids may be flowed through different cooling passages 80 formed in the cooling element 16.

Referring again to FIG. 1, the linear motor may also include a forcer device 120. The forcer device 120 may be configured to engage the canal 68 formed on the cooling element 16 and move through the device channel 18. As shown in FIG. 7, the forcer device 120 includes a forcer body 122 having a first face 124 and a second face 126. A canal engaging surface 128 may be formed on the forcer body 122. In one embodiment, the forcer body 122 is manufactured from a material configured to react to the application of a magnetic field. For example, the forcer body 122 may be constructed from steel, ferromagnetic materials, iron, plastics and/or ceramics impregnated with magnetic materials, and the like. In an alternate embodiment, the forcer device 120 includes one or more magnetic coils. For example, the magnetic coils may be internal to the forcer body 122, external to the forcer body 122, or both. Optionally, the forcer body 122 may include one or more bearing regions 130 having one or more bearing devices 132 therein. For example, the bearing regions 130 may include one or more ball bearing, roller bearings, or the like.

Figure 8:
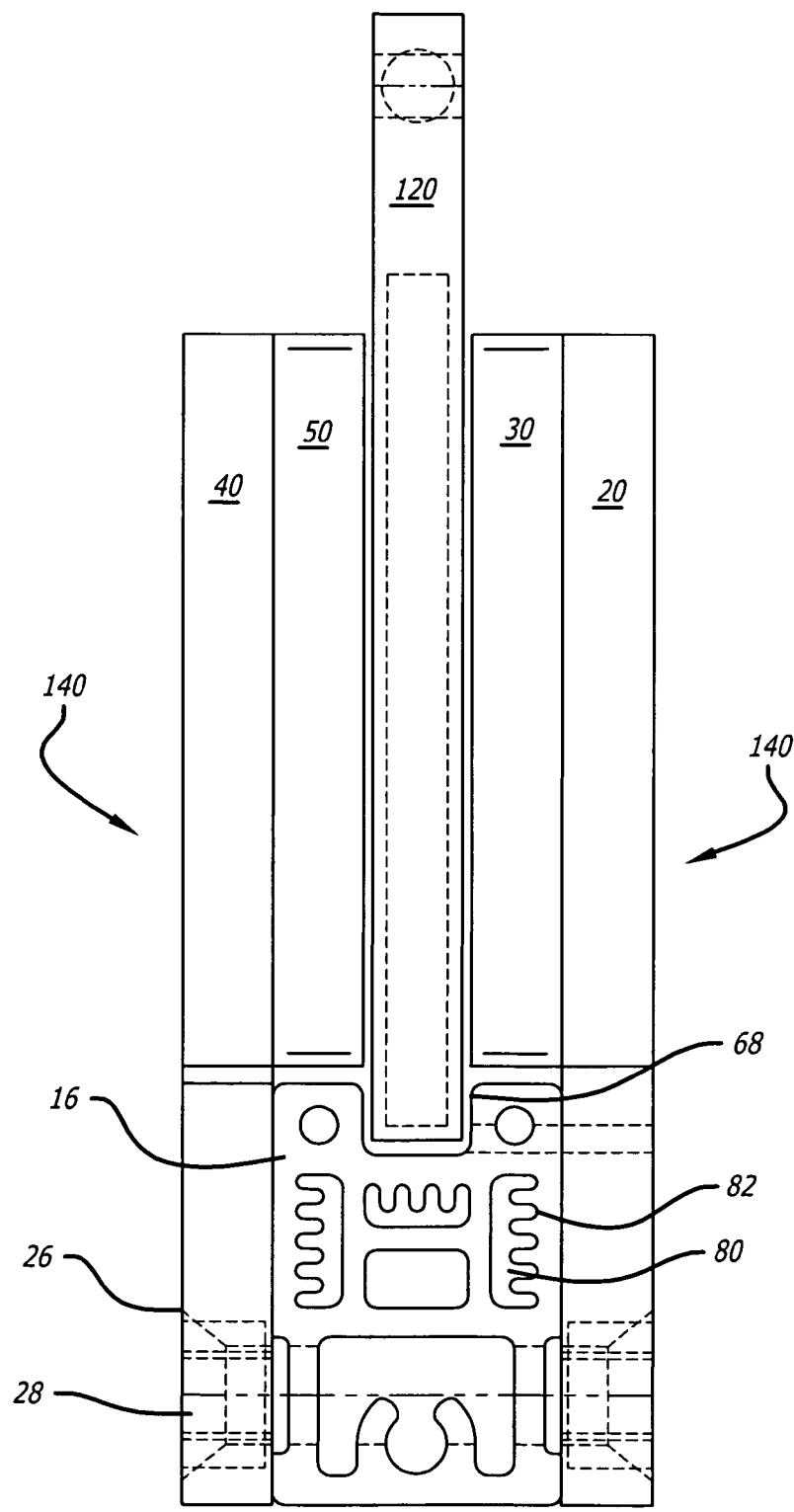
FIG. 8 shows a cross-sectional view of an embodiment of an assembled linear motor.

FIG. 8 shows a cross sectional view of an embodiment of an assembled linear motor. As shown, the forcer device 120 is positioned between the magnetic elements 30, 50 positioned on the first and second mounting plates 20, 40, and within the canal 68 formed on the cooling element 16. The mounting plates 20, 40 are coupled to the cooling element 16 using fasteners 28 positioned within fastener recess 26. During use, one or more fluids may be flowed through the cooling passages 80 formed within the cooling element 16. The cooling passages 80 include one or more heat sink wall member 82 configured to increase the surface area of the cooling passages 80 thereby increasing the thermal transfer characteristics of the cooling element 16. FIG. 8 also shows an insulating material 140 applied to the first and second mounting plates 20, 40 to electrically, thermally, or electrically and thermally isolate the linear motor from the surround environment.

During use, at least one cooling fluid may be introduced into the cooling passages 80 formed in the cooling element 16. For example, water or another cooling fluid may be introduced into the cooling passages 80 through at least one of the ports 112, 114 formed on the end cap 102. In addition, cooling fluids may be evacuated from the cooling passages 80 through at least one port 112, 114. As such, at least one coupling device may be positioned proximate to or within the ports 112, 114. For example, the ports 112, 114 may be threaded and configured to accept a coupler positioned on a supply hose. Unlike prior art devices relying on passive cooling, the linear motor disclosed herein incorporates an active cooling system flowing cooling fluids through the cooling element 16.

The foregoing description of various embodiments of improved cooling systems form linear motors has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A linear motor, comprising:
   a first mounting plate having an interior face disposing one or more magnetic elements thereon;
   a second mounting plate having an interior face disposing one or more magnetic elements thereon;
   a cooling element positioned between the interior faces of the first and second mounting plates and defining one or more cooling passages therein, the cooling passages having one or more heat sink wall members therein;
   at least one end cap configured to be coupled to the cooling element and enclose the cooling passages therein;
   at least one seal member positionable between the end cap and the cooling element and configured to couple the end cap to the cooling element in sealed relation; and
   a forcer device positioned between the magnetic elements on the first and second mounting plates and configured to movably engage the cooling element.

2. The device of claim 1 wherein the first and second mounting plates and manufactured from the same material.

3. The device of claim 1 wherein the first and second mounting plates and manufactured different materials.

4. The device of claim 1 wherein at least one of the first and second mounting plates are manufactured from at least one material selected from the group consisting of steel, aluminum, titanium, brass, ferromagnetic materials, copper, metallic alloys; various plastics, vinyl, polyester, polystyrene, and polycarbonate, ceramic materials, elastomers; fiberglass, composite materials, and glass impregnated materials, and glass-reinforced materials.

5. The device of claim 1 wherein the magnetic elements positioned on the first mounting plate and the magnetic elements on the second mounting plate are manufactured from the same material.

6. The device of claim 1 wherein the magnetic elements positioned on the first mounting plate and the magnetic elements on the second mounting plate are manufactured from different materials.

7. The device of claim 1 wherein the cooling element further includes at least one canal formed thereon, the forcer configured to engage the canal in movable relation.

8. The device of claim 7 further comprising at least one bearing system positioned within the canal.

9. The device of claim 1 wherein the heat sink wall members are configured to increase the surface area of the cooling passages thereby improving the thermal transfer characteristics of the cooling elements.

10. The device of claim 1 further comprising at least one fastener configured to couple the first and second mounting plates to the cooling element.

11. The device of claim 1 wherein the cooling element comprises multiple cooling passages formed within the cooling element.

12. The device of claim 1 wherein the end cap devices includes at least one port formed therein, the port in fluid communication with at least one cooling passage formed in the cooling element.

13. The device of claim 1 wherein at least one of the first and second mounting plates includes an insulating material therein.

14. The device of claim 13 wherein the insulating material is an electrical insulating material.

15. The device of claim 13 wherein the insulating material is an thermal insulating material.

16. The device of claim 1 wherein the forcer device includes at least one bearing system thereon.

17. A linear motor, comprising:
   a first mounting plate having an interior face disposing one or more magnetic elements thereon;
   a second mounting plate having an interior face disposing one or more magnetic elements thereon;
   a cooling element positioned between the interior faces of the first and second mounting plates and defining one or more cooling passages therein, the cooling passages having one or more heat sink wall members therein;
   at least one end cap configured to be coupled to the cooling element and enclose the cooling passages therein, the end cap having one or more ports formed thereon, the one or more ports in fluid communication with the cooling passages formed within the cooling element;
   at least one seal positionable between the end cap and the cooling element and configured to couple the end cap to the cooling element in sealed relation; and
   a forcer device positioned between the magnetic elements on the first and second mounting plates and configured to movably engage the cooling element.

18. The device of claim 17 wherein the cooling element further includes at least one canal formed thereon, the canal having a bearing system configured to engage the forcer device in movable relation.

* * * * *